United States Patent [19]

Gilkinson et al.

[11] Patent Number: 5,611,944
[45] Date of Patent: Mar. 18, 1997

[54] HOLLOW COMPONENT MANUFACTURE

[75] Inventors: John J. Gilkinson; Brian Richardson, both of Lancashire, England

[73] Assignee: Rolls-Royce plc, Derby, England

[21] Appl. No.: 430,617

[22] Filed: Apr. 28, 1995

[30] Foreign Application Priority Data

May 10, 1994 [GB] United Kingdom ............ 9409303

[51] Int. Cl.$^6$ .................... B23K 11/11; B23K 11/34; B23K 101/04
[52] U.S. Cl. ............. 219/117.1; 219/86.1; 219/91.2; 228/157; 228/173.3
[58] Field of Search ................ 219/86.1, 91.2, 219/91.23, 117.1, 121.12, 121.13, 121.14, 121.36, 121.45, 121.46, 121.59, 121.63, 121.64; 228/60, 173.3, 186; 29/889.7, 889.72; 415/115, 119; 416/97 R, 241 R

[56] References Cited

U.S. PATENT DOCUMENTS

| 2,820,286 | 1/1958 | Andrus .................... 219/117.1 |
| 3,066,393 | 12/1962 | Malagari et al. .......... 228/186 |
| 4,429,824 | 2/1984 | Woodward . |
| 5,263,638 | 11/1993 | Douglas .................... 228/186 |
| 5,284,288 | 2/1994 | Woodward . |
| 5,449,109 | 9/1995 | Chuang et al. ............ 228/157 |

FOREIGN PATENT DOCUMENTS

| 139404 | 1/1980 | Germany .......... 219/91.23 |
| 62-93083 | 4/1987 | Japan ................ 219/91.23 |
| 1381183 | 1/1975 | United Kingdom . |
| 2273256 | 1/1993 | United Kingdom . |

*Primary Examiner*—Teresa J. Walberg
*Assistant Examiner*—J. Pelham
*Attorney, Agent, or Firm*—Cushman Darby & Cushman IP Group of Pillsbury Madison & Sutro LLP

[57] ABSTRACT

In a method of manufacturing a hollow component metallic sheets are diffusion bonded together except where a stop off pattern is applied to the surfaces of the sheets. A gas channel is accommodated in the thickness of the sheets for the entry of pressurised gas under superplastic forming conditions to produce the hollow component. The material defining the gas channel is locally deformed by forging to reduce the height of the gas channel in order that a subsequent fusion welding pass over the deformed area defining the gas channel hermetically seals the gas channel.

11 Claims, 4 Drawing Sheets

HOLLOW COMPONENT MANUFACTURE

FIELD OF THE INVENTION

This invention relates to a process for hermetically sealing hollow components after they have been superplastically formed.

BACKGROUND OF THE INVENTION

Superplastic forming and diffusion bonding (SPF/DB) techniques are becoming widely used for the production of many types of hollow metallic "sandwich" type fabrications with an internal structure, such as airframe and aeroengine components or heat exchanger matrices. In some such components it is desirable to ensure that their internal structures are hermetically sealed against ingress of corrosive agents from the environment, such as water vapour and oxygen. In such cases the hollow structure can be evacuated after the superplastic forming process has been completed, or alternatively purged and filled (perhaps under pressure) by a suitable inert gas, such as nitrogen or argon.

Briefly, the usual way of achieving superplastic forming of the interior structure of a hollow component manufactured from a number of metallic layers is to diffusion bond the layers to each other in selected places to define the areas in the interior structure where superplastic forming will not occur. Thereafter the component is heated to a suitable temperature in a furnace and inflated by pumping an inert gas into its interior at high pressure until a desired amount of superplastic deformation occurs. During inflation the component is restrained between dies to prevent over-inflation and achieve the desired external shape. Inflation is conveniently achieved by means of at least one small diameter pipe which is welded into the structure at a non-critical point, e.g., where material is to be trimmed off to provide the finished external shape of the component. To ensure minimum interference with the structure of the component by the pipe, we prefer that the pipe projects only a little way into the component, connection to the prospective hollow interior being completed by means of a gas entry passage in the form of at least one slot or groove in one or more of the layers. The same pipe can then be used as a means for final evacuation or pressurisation of the hollow interior. Thereafter, the gas entry passage can be sealed and the pipe removed.

We have found that the cheapest and most convenient way of sealing a gas entry passage while maintaining a vacuum or inert atmosphere in the hollow internal structure is to make a fusion weld pass across the passage through the outer layer or layers of the component.

However, a problem arises when the weld pass is made. Although the gas entry passage is initially of very small height in the welding direction, so that the molten weld material might be expected to bridge it satisfactorily during the short interval before it solidifies, during superplastic forming the passage expands somewhat under the high superplastic forming temperatures and pressures. Consequently, difficulty is experienced in ensuring that the weld material satisfactorily bridges the passages thickness, particularly when the interior of the component is evacuated or pressurised. In the former case, the molten weld material tends to be sucked into the interior of the structure and in the latter case it tends to be blown out towards the pipe. Thus, there is a danger that the weld produced will be porous and the component will not be properly hermetically sealed.

SUMMARY OF THE INVENTION

The invention seeks to provide an improved process for hermetically sealing hollow components after they have been superplastically formed in the manner described above.

The invention also seeks to provide an improved superplastically formed hollow component with improved integrity against environmental contamination of its interior. In particular, the invention provides an improved hollow fan blade for a turbofan engine.

According to the present invention a hollow component manufacturing method includes the steps of:

joining at least two metallic sheets by a process of diffusion bonding them together in selected places, at least one of the sheets being capable of superplastic deformation and at least one of the sheets accommodating in the thickness thereof gas channel means for entry of pressurised gas into the interior of the component after diffusion bonding;

where the sheets are not diffusion bonded together, expanding at least one of said sheets away from at least one other sheet by means of inflation by pressurised gas under superplastic forming conditions to produce the desired hollow interior structure for the component;

locally deforming the material of at least one of the sheets at least in the area defining the gas channel means to reduce the height of said gas channel means; and making at least one fusion weld pass over the deformed area defining the gas channel means thereby to obturate the gas channel means with weld material such that the gas channel means is hermetically sealed.

The local deformation of the material defining the gas channel means may occur on both sides of the component.

The required local deformation of the material defining the gas channel means may be achieved by locally forging the material by suitable application of heat and pressure. To ensure that the passage is adequately closed it may be necessary to apply a plurality of forging operations over immediately adjacent areas of the material. We have found that this can be conveniently achieved by use of resistance spot welding apparatus, the welding electrodes being applied to the material defining the channel means, or to a wider area as necessary.

Preferably, the fusion weld is caused to penetrate into the material on both sides of the the channel means. Laser welding, electron beam welding, or plasma welding techniques may be utilised as desired or required for satisfactory weld quality.

The invention may be practised with a component having three, four, or more sheets, at least when the gas entry passage to be sealed is accommodated in one of the outer sheets.

According to a further aspect of the present invention a hermetically sealed hollow component comprises at least two metallic sheets, at least one of which is capable of superplastic deformation, the metallic sheets having been joined by diffusion bonding in selected places and where not diffusion bonded, the at least one superplastically deformable sheet having been expanded away from at least one other sheet by means of inflation by pressurised gas under superplastic forming conditions to define a hollow interior structure, gas connection to the hollow interior having been achieved by means of at least one gas entry passage whose height is accommodated in the thickness of at least one sheet, wherein subsequent to superplastic forming the material defining said passage has been locally deformed to reduce the height of said passage, said passage subsequently having been hermetically sealed by at least one fusion weld.

BRIEF DESCRIPTION OF THE DRAWINGS

The invention will be more fully described, by way of example with reference to the accompanying drawings in which.

DETAILED DESCRIPTION OF THE INVENTION

Figure 1:
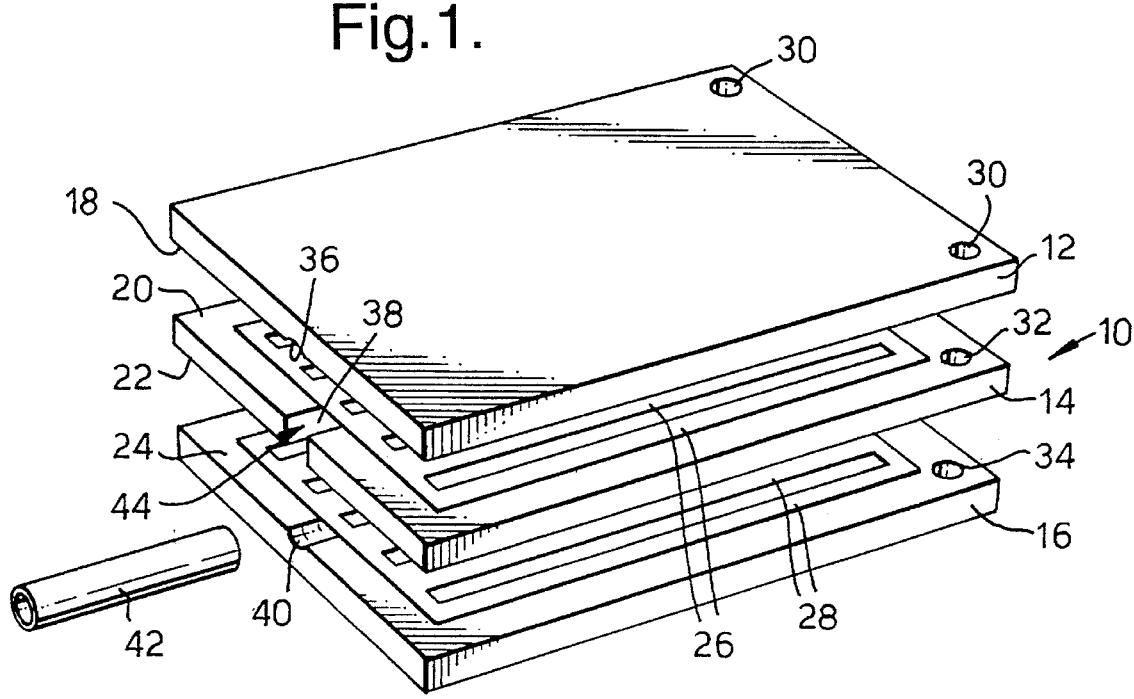
FIG. 1 illustrates an exploded view of a stack of workpieces which are diffusion bonded and superplastically formed to form a hollow component according to the present invention.

In FIG. 1, three sheets of titanium alloy 12, 14 and 16 are assembled into a stack 10.

Prior to assembling the sheets 12, 14 and 16 into the stack 10, the mating surfaces 18, 20, 22 and 24 of the sheets 12, 14 and 16 are prepared for diffusion bonding by chemical cleaning. One of the mating surfaces 18 and 20, in this example mating surface 20, has had a stop off material applied, and one of the mating surfaces 22 and 24, in this example mating surface 24, has had a stop off material applied. The stop off material may comprise powdered yttria in a binder and solvent, e.g. the stop off known as "stopyt 62A" which is sold by an American Company name GTE Service Corporation of 100 Endicott Street, Danvers, Mass. 01928 USA.

The stop off material is applied in desired patterns 26 and 28, shown as the shaded areas in FIG. 1, by the known silk screen printing process. But other suitable methods may be used. The desired patterns 26 and 28 of stop off material prevent diffusion bonding between preselected areas of the sheets 12, 14 and 16. In this example the stop off is applied in straight lines, but it may be applied as dots or other suitable patterns depending on the particular hollow component to the manufactured. The three sheets of titanium alloy 12, 14 and 16 are then assembled into the stack 10. The sheet 12 has a pair of dowel holes 30 which are axially aligned with corresponding dowel holes 32 in sheet 14 and with corresponding dowel holes 34 in sheet 16 to ensure the correct positional relationship between the three sheets 12, 14 and 16 in the stack 10. The sheets 12, 14 and 16 are maintained in this positional relationship by a pair of dowels (not shown) which are inserted in the axially aligned dowel holes 30, 32 and 34.

Figure 2:
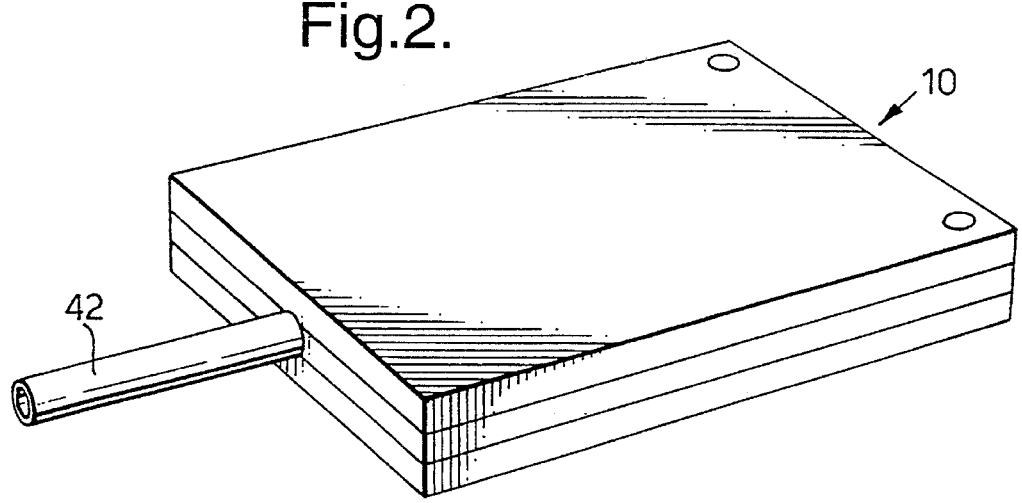
FIG. 2 illustrates a view of a stack of workpieces after welding together and before diffusion bonding.

The sheets 12, 14 and 16 of the stack 10 are placed together to trap an end of a pipe 42. In this example a groove 36 is machined on surface 18 of sheet 12, a slot 38 is machined through sheet 14 and a groove 40 is machined on surface 24 of sheet 16. The slot 38 in sheet 14 extends between the surfaces 20 and 22 to interconnect the pattern of stop off material between the sheets 12 and 14 with the stop off material between the sheets 14 and 16. The pipe 42 is positioned so as to project from between the three sheets 12, 14 and 16. One end of the pipe 41 interconnects with the pattern of stop off material between the sheets 12 and 14 and also with the pattern of stop off material between the sheets 14 and 16 via the grooves 36 and 40 and the slot 38 which form a channel 44 for the flow of gas. On completion of the assembly in the manner described it is welded about its periphery, so as to weld the edges of sheets 12 and 14 together, and so as to weld the edges of sheets 14 and 16 together. The pipe 42 is also welded around its periphery to the sheets 12, 14 and 16. A sealed assembly is formed except for the inlet provided by the pipe 42 as shown in FIG. 2.

It is of course possible to machine grooves on the mating surfaces of one pair of sheets to trap an end of a pipe, and to provide apertures, or slots through one of these sheets to interconnect with the stop off patterns between all the sheets. As a further alternative, it is possible to machine grooves on each set of mating surfaces of the sheets to trap an end of a pipe. In this variant a number of pipes are required. In the last two possibilities it is possible to machine the grooves in one, or both, of the mating surfaces of the sheets.

The pipe 42 is then connected to a vacuum pump which is used to evacuate the interior of the sealed assembly. Alternatively the pipe 42 is connected to a vacuum pump which is used to evacuate the interior of the sealed assembly, and then inert gas, for example argon, is supplied to the interior of the sealed assembly. This process of evacuating and supplying inert gas to the interior of the sealed assembly may be repeated several times in order to ensure that most, or substantially all, traces of oxygen are removed from the interior of the sealed assembly. The particular number of times that the interior of the sealed assembly is evacuated and purged with inert gas depends upon the size of the workpieces and upon the required integrity of the finished component. The smaller the traces of oxygen remaining, the greater the quality of the subsequent diffusion bond. The inert gas is supplied to pressurise the interior of the sealed assembly to atmospheric pressure.

The sealed assembly is evacuated and is placed into an oven. The sealed assembly is then heated to a temperature between 250° C. and 350° C. to evaporate the binder from the stop off material. During the baking out of the binder, the sealed assembly is continuously evacuated to remove the binder from between the sheets. After the binder has been removed, which is determined either by monitoring the binder levels in the gas extracted from the sealed assembly or by maintaining the sealed assembly at the temperature between 250° C. and 350° C. for a predetermined time, the sealed assembly is removed from the oven and is allowed to cool to ambient temperature whilst being continuously evacuated. The binder is baked out of the sealed assembly at a suitably low temperature to reduce, or prevent, oxidation of the exterior surfaces of the sealed assembly.

Figure 3:
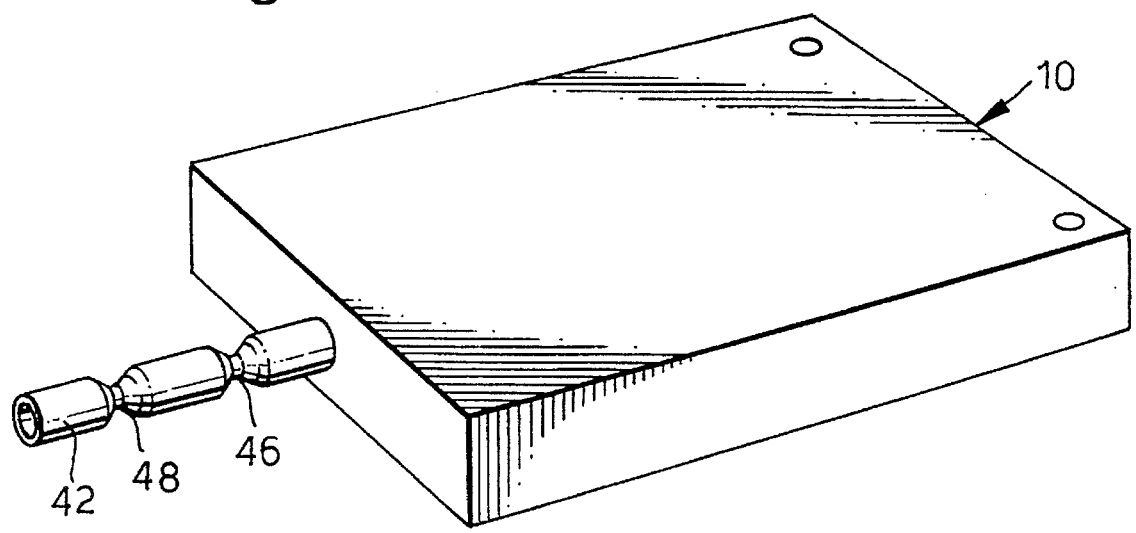
FIG. 3 illustrates a view of a successfully diffusion bonded stack of workpieces.

The pipe 42 is then sealed at two spaced locations 46, 48 as shown in FIG. 3 so that there is a vacuum in the sealed assembly. The reason for sealing the pipe 42 with two welds is discussed more fully in our published UK patent application GB2269556A. The sealed assembly is then transferred carefully to an autoclave because the stop off is brittle and easily damaged. Alternatively a predetermined amount of binder may be left in the stop off material, so that the stop off is not too brittle, to enable the sealed assembly to be transferred more easily to the autoclave without damage to the stop off.

The temperature in the autoclave is increased such that the sealed assembly is heated to a temperature greater than 850° C. and the argon pressure in the autoclave is raised to greater than 20 atmospheres, 294 pounds per square inch ($10.26 \times 10^5 \times Nm^{-2}$) and held at that temperature and pressure for a predetermined time. Preferably the temperature is between 900° C. and 950° C., and the pressure is between 294 pounds per square inch ($10.26 \times 10^5 \times Nm^{-2}$) and 441 pounds per square inch ($30.39 \times 10^5 \times Nm^{-2}$). For example, the temperature is raised to 925° C. and the pressure is raised to 300 lbs/sq in the temperature and pressure is held constant for about 2 hours. The pressure is then reduced to ambient, diffusion bonding having been achieved and the sealed assembly, which is then an integral structure, is removed.

Figure 4:
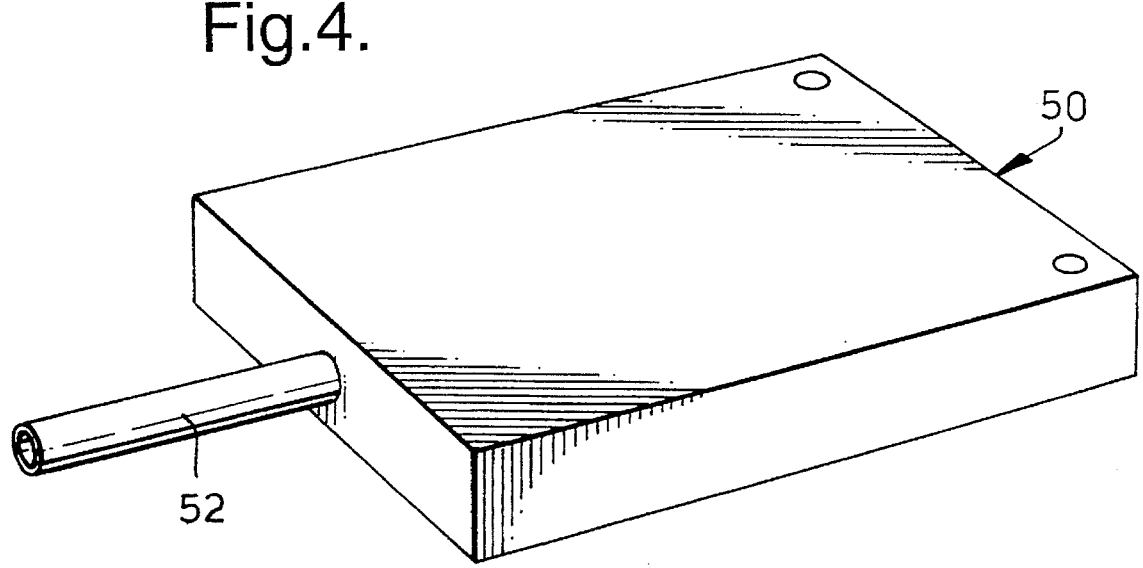
FIG. 4 illustrates a view of the diffusion bonded stack of workpieces before superplastic forming.

The pipe 42 is then removed and a second pipe 52 is welded to the integral structure 50, as shown in FIG. 4 and argon is introduced into the areas, within the integral structure, containing the stop off in order to break the adhesive grip which the diffusion bonding pressure has brought about. The argon is carefully introduced to those areas which contain the stop off, and the argon seeps through the stop off and eventually reaches the opposing end of the integral structure. The argon may initially be caused to travel between one pair of workpieces and on reaching the opposite end return to the inlet end between another pair of sheets. In any event, the argon should preferably travel the whole length of the interior of the integral structure such as to break the adhesive grip between the stop off and the sheets brought about during the diffusion bonding step.

The breaking of the adhesive grip between the confronting stop off coated areas of the sheets is achieved by introducing argon at high pressure via the pipe 52 into the integral structure. The process is known as cracking and is performed to ensure that the pipe 52 entry and the gas channel 44 to which it connects, provide an open passageway and do not restrict pressurisation of the interior structure of the integral structure. The interior structure of the integral structure before cracking is of course defined by the stop off material.

Cracking may be carried out at room temperature because the metal is elastic at room temperature and the minimal extension which occurs does not go beyond the elastic limit. Consequently, the integral structure regains its shape when the pressure is removed at the end of the step. Care is taken to ensure that the extension which occurs due to pressurisation with the argon does not go beyond the elastic limit. Consequently, the structure regains its shape when pressure is removed at the end of the step. This known as a "cold crack" technique.

Alternatively, cracking may be carried out at the temperature required for superplastic forming. This is known as a "hot crack" technique. In this case, plastic deformation of the structure produced by pressurisation must be insufficient to cause "ballooning" and thinness of the material in and near the pipe entry.

Whether a cold crack or a hot crack operation is performed is at the choice of the manufacturer, and is dependent upon the degree of control of expansion of the structure which can be exercised during pressurisation. This will depend partly upon the geometric and material characteristics of the structure being pressurised, and partly upon the fineness of control of pressurisation which is available. Unavoidably, there will be, at least to some extent, matters of experimentation for each different configuration of structure it is desired to manufacture.

Of the two techniques, hot cracking is the more convenient because it can be performed within the superplastic forming split dies as the first stage in the superplastic forming process. However, it should only be adopted if the manufacturer is confident that he can control the process so as to avoid excessive plastic deformation when pressurising the structure, because otherwise rupture of one or more of the sheets 12, 14, 16 can occur.

If a hot crack operation is carried out, the integral structure is placed between appropriately shaped superplastic forming split dies positioned within an autoclave. The autoclave is evacuated and the integral structure is again heated between the dies to a temperature greater than 850° C., preferably between 900° C. and 950° C. In this example, the dies and integral structure are heated to 925° C. Argon is introduced into the interior of the integral structure to break the adhesive bonds. The superplastic forming step can begin as soon as the spaces defined by the inner walls of the dies and the outer surfaces of the integral structure are evacuated. Argon is introduced into the interior of the integral structure between the adjacent sheets so as to force the outer sheets 12, 16 into the respective die half shapes which generates an internal structure depending on the pattern of the applied stop off.

If a cold crack operation is carried out, after the cracking step the integral structure is placed between appropriately shaped superplastic forming split dies positioned within an autoclave. The autoclave is evacuated and the integral structure is again heated between the dies to a temperature greater than 850° C., preferably between 900° C. and 950° C. In this example, the dies and integral structure are heated to 925° C. Argon is introduced into the interior of the integral structure between the adjacent sheets, so as to force the outer sheets 12, 16 into the respective die half shapes which generates an internal structure depending on the pattern of the applied stop off.

The magnitude of the movement of at least one of the sheets during deformation, is such as to require superplastic extension to occur. The term "superplastic" is a standard term in the metal forming art and will not be described herein.

In order to achieve superplastic forming without rupturing the thinning metal the argon is introduced in a series of pulses, at a precalculated rate which will achieve a desired strain rate, as in taught at pp 615–623 in the book "The Science, Technology and Applications of Titanium" edited by R I Jaffe and N E Promisel, published by Pergamon Press in 1970, which is hereby incorporated by reference. The method ensures that the metal is subjected to that strain rate which will achieve the maximum permissible speed of extension at any given point in the procedure. The rate of application, and/or volume of the gas pulses may thus vary during the expansion of the sheets.

On completion of superplastic forming, the inert argon atmosphere within the integral structure is maintained whilst the structure is cooled. The interior of the integral structure is then evacuated, or pressurised to a predetermined pressure, by means of the pipe 52 and then the gas channel 44 is sealed and the pipe 52 is removed.

As discussed earlier in the specification the temperatures and pressures used during the superplastic forming step cause the gas channel 44 to expand. Thus there has been a difficulty ensuring that the weld material used to bridge the gas channel 44 closes the gas channel 44.

Figure 5:
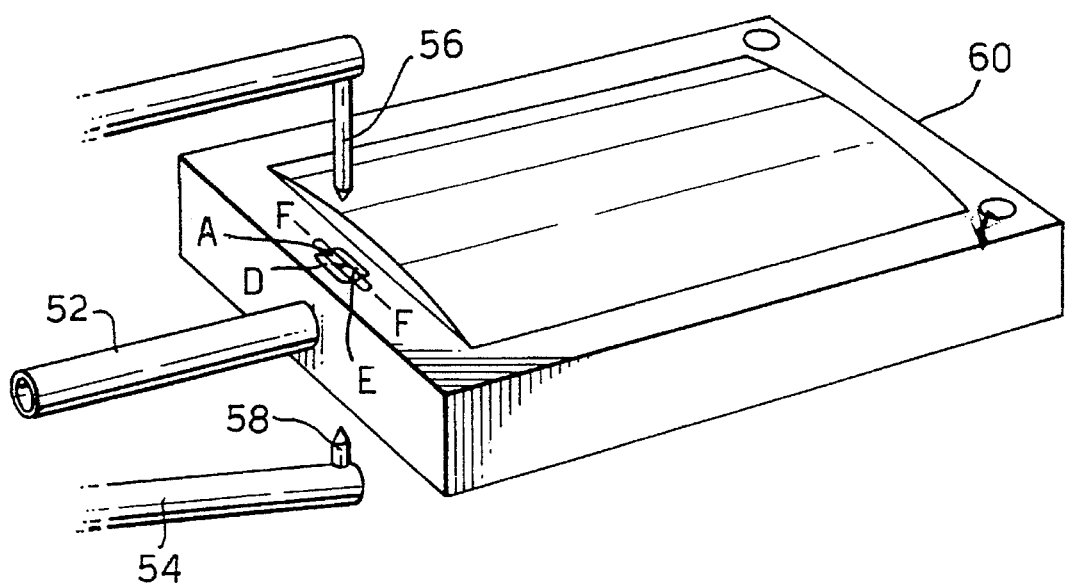
FIG. 5 illustrates a view of the diffusion bonded stack of workpieces after superplastic forming.
Figure 6:
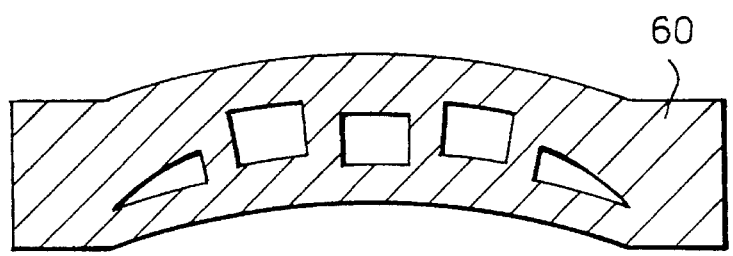
FIG. 6 is a cross-section through the diffusion bonded stack of workpieces after superplastic forming.
Figure 7:
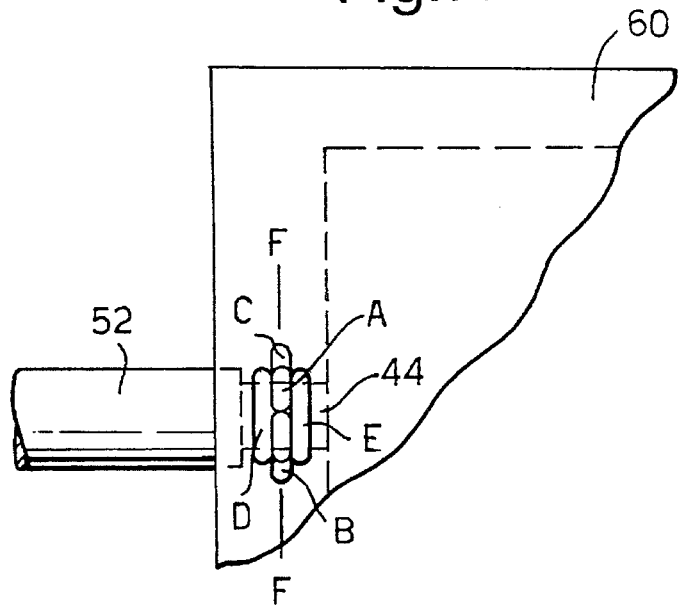
FIG. 7 is a plan view of part of the diffusion bonded stack of workpieces after superplastic forming illustrating the hermetic sealing of the hollow component.

In order to ensure that the gas channel 44 is completely closed to form a hermetically sealed hollow finished component, the material defining, overlying and underlying, the gas channel 44 is initially deformed to reduce the height of the gas channel 44 and the gas channel 44 is subsequently fusion welded to seal the gas channel 44 as shown in FIGS. 5 and 7.

Figure 8:
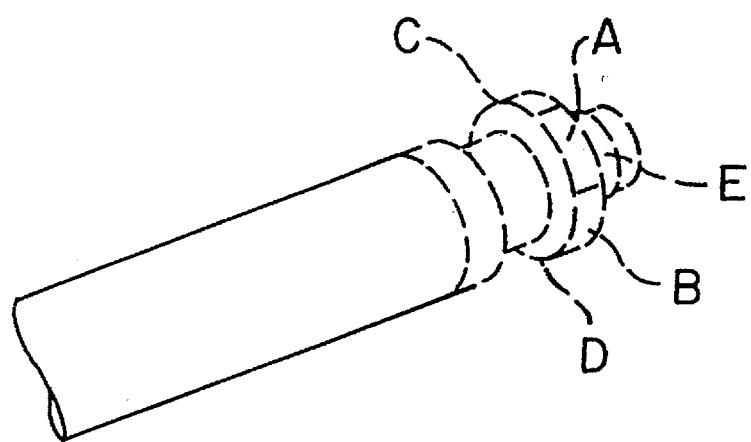
FIG. 8 is a perspective view of the deformation areas as applied about a gas channel.

The deformation is achieved by locally forging by applying heat and pressure to the material defining, overlying and underlying, the gas channel 44. In this example a spot welding apparatus 54 is used to locally forge the material defining, overlying and underlying, the gas channel 44. The electrode 56 of the spot welding apparatus 54 is applied to the material overlying the gas channel 44 and at adjacent areas and the electrode 58 is applied to the material underlying the gas channel 44 and at adjacent areas. For example the electrodes 56, 58 are applied sequentially to the areas A, B, C, D and E. Areas A, D and E are centred around the centre line of the gas channel 44, but at adjacent positions longitudinally of the gas channel 44, these forge material across the full width of the gas channel 44. Areas B and C are centred around the sides of the gas channel 44, at the same longitudinal position as area A, these forge material across half of the width of the gas channel 44 and adjacent areas. A clearer view of the relative positions of these areas a, b, c, d and e is shown in FIG. 8.

The gas channel 44 is hermetically sealed by fusion welding the deformed area overlying and underlying the gas channel 44. In this example the fusion welding is by laser welding, but it may be possible to use electron beam welding or plasma welding. The gas channel 44 is sealed by one or more fusion welding passes F over the deformed area overlying and underlying the gas channel 44, for example a single fusion welding pass over areas A, B and C. Preferably the fusion weld penetrates the material at both sides of the gas channel 44.

It may be possible, or necessary, to use more forging operations than those indicated in FIGS. 5 and 7. It may be possible to forge only the material overlying the gas channel, or forge only the material underlying the gas channel, while the material at the opposite side of the gas channel remains undeformed.

The sealed integral structure may be the finished component or some final machining of the integral structure may be required to produce the finished component.

Although the description has referred to titanium sheets the present invention is equally applicable to sheets of other elementary metals, metal alloys, intermetallics and metal matrix composites which are diffusion bondable and one of the sheets must be capable of superplastic extension. Aluminium and stainless steel are capable of superplastic extension at suitable temperatures and pressures. Although the description has referred to a stack of three metal sheets it is possible to use stacks comprising two metal sheets or stacks comprising four or more metal sheets depending upon the particular component to be manufactured.

The spot welding method for forging the metal overlying and underlying the gas channel may be replaced by any other suitable forging process.

The method is suitable for manufacturing heat exchangers, components for turbomachines, for example fan blades, fan duct outlet guide vanes etc.

The invention has been described with reference to solid state diffusion bonding, but it is equally possible to use activated diffusion bonding in which metal foil activators are placed between the sheets and which melt and immediately solidify to form the diffusion bond at the bonding temperature.

We claim:

1. A hollow component manufacturing method including the steps of:
   (a) forming at least two metallic sheets by a process of diffusion bonding them together in selected places, at least one of the sheeets being capable of superplastic deformation and at least one of the sheets accommodating in the thickness thereof gas channel means for entry of pressurized gas into the interior of the component after diffusion bonding,
   (b) where the sheets are not diffusion bonded together, expanding at least one of said sheets away from at least one other sheet by means of inflation by supplying pressurized gas under superplastic forming conditions through the gas channel means into the interior of the component to produce the desired interior structure for the component,
   (c) locally deforming the material of at least one of the sheets at least in the area defining the gas channel means to reduce the height of said gas channel means,
   (d) making at least one fusion weld pass over the deformed area defining the gas channel means thereby to obturate the gas channel means with weld material such that the gas channel means is hermetically sealed.

2. A method as claimed in claim 1 comprising deforming the material defining the gas channel means on both sides of the component.

3. A method as claimed in claim 1 or claim 2 wherein the local deformation of the material defining the gas channel means is by locally forging the material by application of heat and pressure.

4. A method as claimed in claim 3 wherein a plurality of forging operations are performed over immediately adjacent areas of the material.

5. A method as claimed in claim 3 wherein the material defining the gas channel means is locally deformed by the use of a resistance spot welding apparatus, the welding electrodes being applied to the material defining the channel means, or to a wider area.

6. A method as claimed in claim 1 wherein the fusion weld is caused to penetrate into the material on both sides of the channel means.

7. A method as claimed in claim 6 wherein the fusion welding is performed by laser welding, electron beam welding or plasma welding.

8. A hermetically sealed hollow component comprises at least two metallic sheets at least one of which is capable of superplastic deformation, the metallic sheets having been joined by diffusion bonding in selected places and where not diffusion bonded, the at least one superplastically deformable sheet having been expanded away from the at least one other sheet by means of inflation by pressurised gas under superplastic forming conditions to define a hollow interior structure, gas connection to the hollow interior having been achieved by means of at least one gas entry passage whose height is accommodated in the thickness of at least one sheet, wherein subsequent to superplastic forming the material defining said passage has been locally deformed to reduce the height of said passage, said passage subsequently having been hermetically sealed by at least one fusion weld.

9. A hollow component as claimed in claim 8 wherein the component is a gas turbine engine blade or vane.

10. A hollow component as claimed in claim 9 wherein the component is a fan blade.

11. A hollow component as claimed in claim 8 wherein the component is heat exchanger.

* * * * *